(12) United States Patent
Almutairi et al.

(10) Patent No.: US 12,195,361 B2
(45) Date of Patent: Jan. 14, 2025

(54) SYSTEM AND METHOD TO SUSTAINABLE INTEGRATED WASTEWATER TREATMENT AND AIR-COOLING IN A STEELMAKING PLANT

(71) Applicant: Saudi Arabian Oil Company, Dhahran (SA)

(72) Inventors: Faisal B. Almutairi, Dammam (SA); Ali Abdulaziz Al-Ugla, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 68 days.

(21) Appl. No.: 18/112,140

(22) Filed: Feb. 21, 2023

(65) Prior Publication Data

US 2024/0279079 A1 Aug. 22, 2024

(51) Int. Cl.
*C02F 1/16* (2023.01)
*B01D 1/00* (2006.01)
(Continued)

(52) U.S. Cl.
CPC .............. *C02F 1/16* (2013.01); *B01D 1/0058* (2013.01); *B01D 1/0082* (2013.01); *B01D 5/006* (2013.01);
(Continued)

(58) Field of Classification Search
CPC .......... C02F 1/008; C02F 1/0048; C02F 1/16; C02F 2101/12; C02F 2101/20;
(Continued)

(56) References Cited

U.S. PATENT DOCUMENTS 4,055,948 A 11/1977 Kraus
4,201,924 A * 5/1980 Uram .................... F01K 23/108
290/40 R
(Continued)

FOREIGN PATENT DOCUMENTS

CN 102454440 4/2015
CN 108626083 10/2018
(Continued)

OTHER PUBLICATIONS

Espacenet Machine Translation of CN 115218247 Obtained Jun. 24, 2024. (Year: 2024).*

(Continued)

*Primary Examiner* — Jonathan Miller
(74) *Attorney, Agent, or Firm* — Fish & Richardson P.C.

(57) ABSTRACT

Some implementations provide an integrated system that includes: a wastewater treatment system configured to process wastewater released by one or more furnaces at a steelmaking plant, and generates reused wastewater using the wastewater; a heat recovery apparatus configured to utilize exhaust gas from the one or more furnaces at the steelmaking plant, and heat the reused wastewater generated by the wastewater treatment system above a threshold temperature; and a generator configured to receive, through a water inlet, the reused wastewater heated above the threshold temperature; and an absorption system arranged in circulation with the generator, and wherein the reused water is supplied above a threshold amount such that the generator drives the absorption system and produces cooled air inside the steelmaking plant.

20 Claims, 4 Drawing Sheets

(51) Int. Cl.
*B01D 5/00* (2006.01)
*C02F 1/00* (2023.01)
*C02F 1/04* (2023.01)
*F27D 17/00* (2006.01)
*C02F 101/12* (2006.01)
*C02F 101/20* (2006.01)
*C02F 103/16* (2006.01)
*C21C 5/52* (2006.01)
*F25B 15/16* (2006.01)

(52) U.S. Cl.
CPC .............. *C02F 1/008* (2013.01); *C02F 1/048* (2013.01); *F27D 17/003* (2013.01); *F27D 17/004* (2013.01); *C02F 2101/12* (2013.01); *C02F 2101/20* (2013.01); *C02F 2103/16* (2013.01); *C21C 5/5264* (2013.01); *C21C 2100/06* (2013.01); *C21C 2300/06* (2013.01); *F25B 15/16* (2013.01)

(58) Field of Classification Search
CPC . C02F 2103/16; B01D 1/0058; B01D 1/0082; B01D 5/006; F27D 17/003; F27D 17/004
See application file for complete search history.

(56) References Cited

U.S. PATENT DOCUMENTS

| | | | | |
|---|---|---|---|---|
| 5,925,223 | A * | 7/1999 | Simpson | B01D 5/0081 202/160 |
| 6,044,640 | A * | 4/2000 | Guimaraes | F24F 3/1423 60/39.511 |
| 6,833,056 | B1 * | 12/2004 | Kamiya | C02F 1/16 159/44 |
| 8,051,637 | B2 * | 11/2011 | Labrador | F03G 7/00 60/39.01 |
| 8,544,526 | B2 | 10/2013 | Sudau et al. | |
| 9,488,394 | B1 | 11/2016 | El-Shaarawi et al. | |
| 9,651,313 | B2 | 5/2017 | Trainham et al. | |
| 9,702,597 | B1 | 7/2017 | El-Shaarawi et al. | |
| 9,784,484 | B2 | 10/2017 | El-Shaarawi et al. | |
| 9,835,361 | B2 | 12/2017 | El-Shaarawi et al. | |
| 10,041,707 | B2 | 8/2018 | El-Shaarawi et al. | |
| 10,060,296 | B2 * | 8/2018 | Friesth | F03G 6/068 |
| 10,634,399 | B2 | 4/2020 | El-Shaarawi et al. | |
| 10,634,400 | B2 | 4/2020 | El-Shaarawi et al. | |
| 11,131,482 | B1 | 9/2021 | Al-Ugla | |
| 2004/0045682 | A1 * | 3/2004 | Liprie | B01D 1/0094 159/31 |
| 2005/0120715 | A1 * | 6/2005 | Labrador | F03G 7/00 60/618 |
| 2007/0084208 | A1 | 4/2007 | Goldman | |
| 2008/0155985 | A1 * | 7/2008 | Labrador | F01K 27/00 60/698 |
| 2009/0064680 | A1 | 3/2009 | Ustun | |
| 2009/0313886 | A1 | 12/2009 | Hinman et al. | |
| 2010/0319348 | A1 * | 12/2010 | Jones | F27D 17/004 60/645 |
| 2012/0240577 | A1 | 9/2012 | Mandelberg | |
| 2013/0014508 | A1 | 1/2013 | Brooks | |
| 2013/0207402 | A1 | 8/2013 | Bronicki | |
| 2013/0300038 | A1 * | 11/2013 | Ose | F28D 21/001 266/155 |
| 2014/0075939 | A1 | 3/2014 | Aga et al. | |
| 2015/0143806 | A1 * | 5/2015 | Friesth | F01K 13/02 220/592.2 |
| 2017/0130998 | A1 * | 5/2017 | El-Shaarawi | F25B 27/007 |
| 2018/0347406 | A1 * | 12/2018 | Friesth | F24S 25/50 |
| 2019/0323384 | A1 | 10/2019 | Uechi et al. | |

FOREIGN PATENT DOCUMENTS

| | | | |
|---|---|---|---|
| CN | 115218247 A | * 10/2022 | ............ F24D 19/10 |
| DE | 102011090094 | 7/2013 | |
| EP | 2941475 | 6/2019 | |
| JP | 2012083025 | 4/2012 | |
| WO | WO 2010/138597 | 12/2010 | |

OTHER PUBLICATIONS

Asim, et al., "Sustainability of Heating, Ventilation and Air-Conditioning (HVAC) Systems in Buildings—An Overview," International Journal of Environmental Research and Public Health, Jan. 2022, 19, 1016, 16 pages.

Ferber et al., "Development of an electric arc furnace steel slag-based ceramic material for high temperature thermal energy storage applications," Journal of Energy Storage, Mar. 2022, 51:104408, 15 pages.

McBrien et al., "Potential for energy savings by heat recovery in an integrated steel supply chain." Applied Thermal Engineering, 2016, 103, 592-606, 15 pages.

Morozov, "Comparative Analysis of Hydrogen Production Methods with Nuclear Reactors" IYNC, Sep. 2008, 237.1-237.11, 11 pages.

Wei et al., "The Comprehensive Understanding of 10 mA cmgeo-2 as an Evaluation Parameter for Electrochemical Water Splitting," Small Methods, Nov. 2018, 2(11), 1800168, 3 pages.

Williams, "A Waste Heat Recovery Strategy for An Integrated Steelworks," Thesis for the degree of Doctor of Philosophy, Cardiff University, School of Engineering, Dec. 2015, 259 pages.

International Search Report and Written Opinion in International Appln. No. PCT/US2021/045404, mailed on Dec. 1, 2021, 15 pages.

* cited by examiner

SYSTEM AND METHOD TO SUSTAINABLE INTEGRATED WASTEWATER TREATMENT AND AIR-COOLING IN A STEELMAKING PLANT

TECHNICAL FIELD

This disclosure generally relates to operation at a steelmaking plant such as a steel mill.

BACKGROUND

Steel production is known as an energy intensive industry. The production of one ton of steel can require large amount of electricity, natural gas, coal and other energy sources. During the production process, a certain part of the energy is going into the off gas and is further emitted to the environment.

SUMMARY

In one aspect, the implementations provide a system including: a wastewater treatment system configured to process wastewater released by one or more furnaces at a steelmaking plant, and generate reused wastewater using the wastewater; a heat recovery apparatus configured to heat the reused wastewater, using exhaust gas from the one or more furnaces at the steelmaking plant, above a threshold temperature; and a generator configured to receive, through a water inlet, the reused wastewater heated above the threshold temperature; and an absorption system in circulation with the generator, wherein the reused wastewater is supplied above a threshold amount such that the generator drives the absorption system and produces cooled air inside the steelmaking plant.

Implementations may include one or more of the following features.

The system may further include: a control system comprising one or more computer processors and configured to assert control, using the one or more computer processors, over the wastewater treatment system, the heat recovery apparatus, the generator, and the absorption system, wherein the control system is arranged in communication with the wastewater treatment system, the heat recovery apparatus, the generator, and the absorption system. The control system may be further configured to: in response to receiving information that the reused wastewater does not reach the threshold amount, use the one or more processors to automatically control an emergency valve such that additional water is provided from a fresh water tank to the generator.

The absorption system may include: a lithium bromide (LiBr) absorption system. The absorption system may include: a condenser coupled to the generator; an evaporator coupled to the condenser through a first expansion valve; and an absorber coupled to the evaporator, wherein the absorber is further coupled to the generator through a pump and a second expansion valve.

The control system may be configured to operate the generator in tandem with the wastewater treatment system such that the steelmaking plant is cooled exclusively by cooled air from the absorption system. The one or more furnaces comprise at least one electric arc furnace (EAF). The wastewater treatment system may operate on grid power. The wastewater treatment system may be configured to apply a physical separation, or a chemical separation method, to wastewater from the furnaces at the steelmaking plant. The wastewater treatment system may be configured to process more than 200,000 $m^3$/year of wastewater. The steelmaking plant may have a liquid steel production capacity of between 0.4 and 0.6 million ton/year.

In another aspect, implementations provide a computer-implemented method including: generating reused wastewater using a wastewater treatment system that processes wastewater released by one or more furnaces at a steelmaking plant; heating the reused wastewater provided by the wastewater treatment system, wherein said heating utilizes exhaust gas from the one or more furnaces at the steelmaking plant, and wherein said heating causes the reused wastewater to be exceed a threshold temperature; and supplying, using a water inlet, the reused wastewater heated above the threshold temperature to a generator, wherein the reused wastewater is supplied above a threshold amount such that the generator drives an absorption system arranged in circulation with the generator and configured to produce cooled air inside the steelmaking plant. Implementations may include one or more of the following features.

The method may further include: asserting control over said generating, said heating and said supplying, using a control system that comprises at least one processor. The method may further include: when the reused wastewater does not reach the threshold amount, opening an emergency valve such that additional water is provided from a fresh water tank. The method may further include: asserting control over the absorption system that comprises a lithium bromide (LiBr) absorption system. Asserting control may include: asserting control over a condenser coupled to the generator, an evaporator coupled to the condenser through a first expansion valve, and an absorber coupled to the evaporator, wherein the absorber is further coupled to the generator through a pump and a second expansion valve. The one or more furnaces may include at least one electric arc furnace (EAF). The method may further include: operating the wastewater treatment system using grid power. Operating the wastewater treatment system may include: applying at least one of: a physical separation, or a chemical separation method, to wastewater from the furnaces at the steelmaking plant. The method may further include: operating the generator in tandem with the wastewater treatment system such that the steelmaking plant is cooled exclusively by cooled air from the absorption system.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The disclosed technology is directed to system and method that integrate wastewater treatment and air-cooling in a steelmaking plant. By way of background, steel industry is one of the most energy-intensive industries. For example, almost 25% of the energy consumed by a steel mill is wasted in form of heat. Moreover, most of the steel industry processes are high temperature processes requiring cooling on a massive scale, further exacerbating the crunch on energy demand. The implementations of the present disclosure can utilize this wasted energy to provide cooled air for cooling the building in steel production plants, thereby achieving major cost savings. For example, using heat storage and recovery, the massive heat dissipated by the steel mill, otherwise wasted in a conventional steel mill, can heat a generator to power the air-cooling system. The generator is provided with water supply in sufficient quantity, at least in part, from a wastewater treatment system that processes the wastewater of the steel mill.

The integrated system incorporates a closed-loop mechanical cooling system to provide the required cooling loads. Furthermore, a wastewater treatment system is conjugated with the cooling system to provide the cooling system with sufficient supply of water. The integrated system can achieve substantial savings of electricity and process water, and significant reductions of carbon emission while providing sufficient cooling air for buildings in steel plant. Moreover, the system can be operated from free source of water and power, thereby optimizing energy and water consumption of the steel mill.

Figure 1:
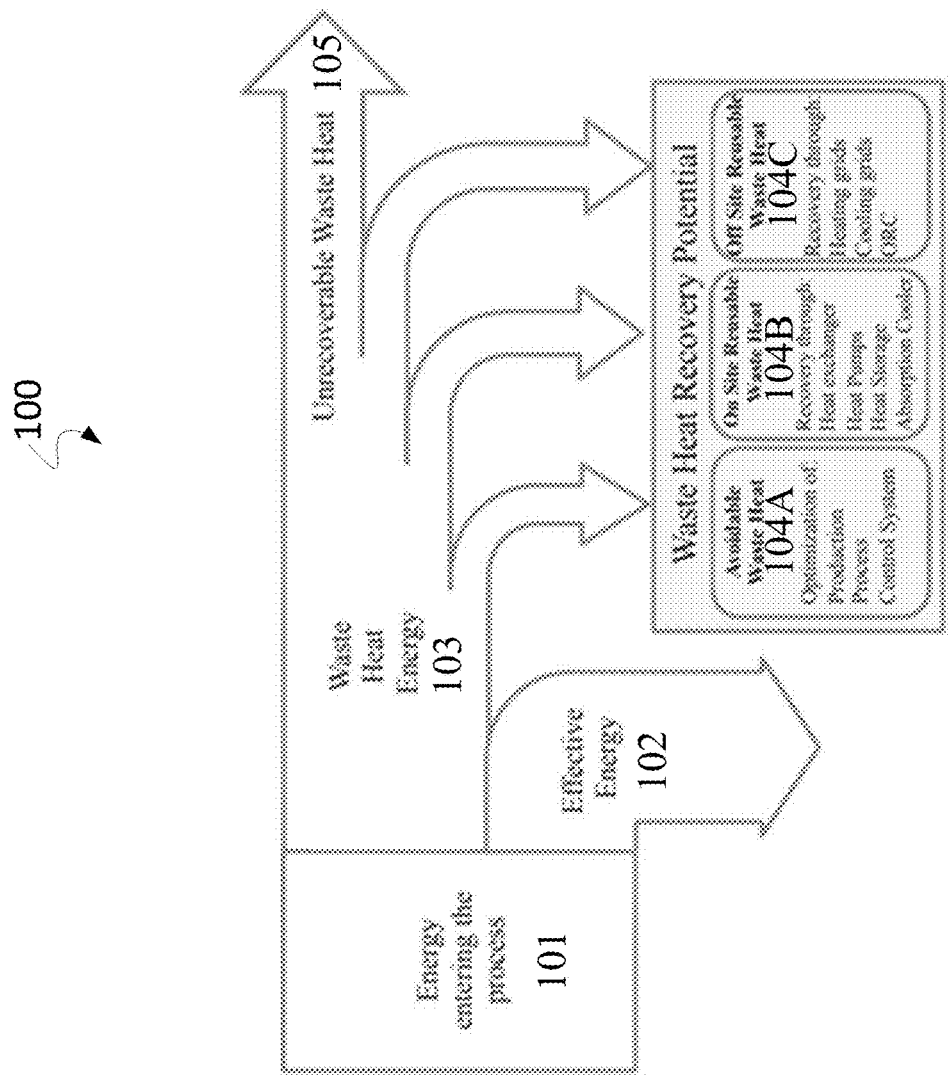
FIG. 1 provides an illustration of examples of waste heat recovery according to some implementations of the present disclosure.

Presently, around 30% of the produced steel in the world is produced through the electric arc furnace (EAF) route. The EAF is the most electricity consumer in the manufacturing process that counts for approximately 35% of the total required energy. About one quarter of EAF energy input is released as waste heat (e.g., flue gases), representing around 150-200 kWh/tone liquid steel. The released flue gases are traditionally treated and cooled down to 250° C. in a flue gas treatment center before ejection into open air. In various implementations, this cooling operation is combined with heat recovery using, for example, a heat recovery apparatus, to produce high quality steam or electricity. FIG. 1 is a diagram 100 illustrating an example of heat recovery for steel mills as used in some implementations of the present disclosure.

As illustrated in diagram 100 of FIG. 1, a given amount of input energy enters a steel manufacturing process (101). This input energy can be in the form of electricity that drives, for example, the operation of one or more electric arc furnaces (EAFs) at the steel mill. The input energy leads to heat production for the manufacturing process of steel. As mentioned, the steel industry is one of the most energy-intensive industries where a substantial level of energy consumed is wasted in form of waste heat, requiring cooling on a massive scale that further exacerbates the crunch on energy demand.

As illustrated, only a portion of the input energy is used as effective energy (102). For example, even high-efficiency furnaces may only achieve a utilization level of 50% of the input energy. The remainder of the input energy becomes waste heat energy (103).

Implementations of the present disclosure can harvest portions of the waste heat energy to improve utilization of the input energy. Potential recoveries of the waste heat energy may include: avoidable waste heat 104A (e.g., through optimization of production, process, and control system to reduce waste heat), on-site reusable waste heat 104B (e.g., recovery through heat exchanger, heat pumps, heat storage, and absorption cooler), and off-site reusable waste heat 104C (e.g., recovery through heating grids, cooling grids, and organic ranking cycle (ORC)). The remainder of the waste heat energy can become unrecoverable waste heat (105). In this illustration, by optimizing the production process control system, the quantity of heat recovered can increase and hence more energy generation through a power production unit can be produced.

Figure 2:
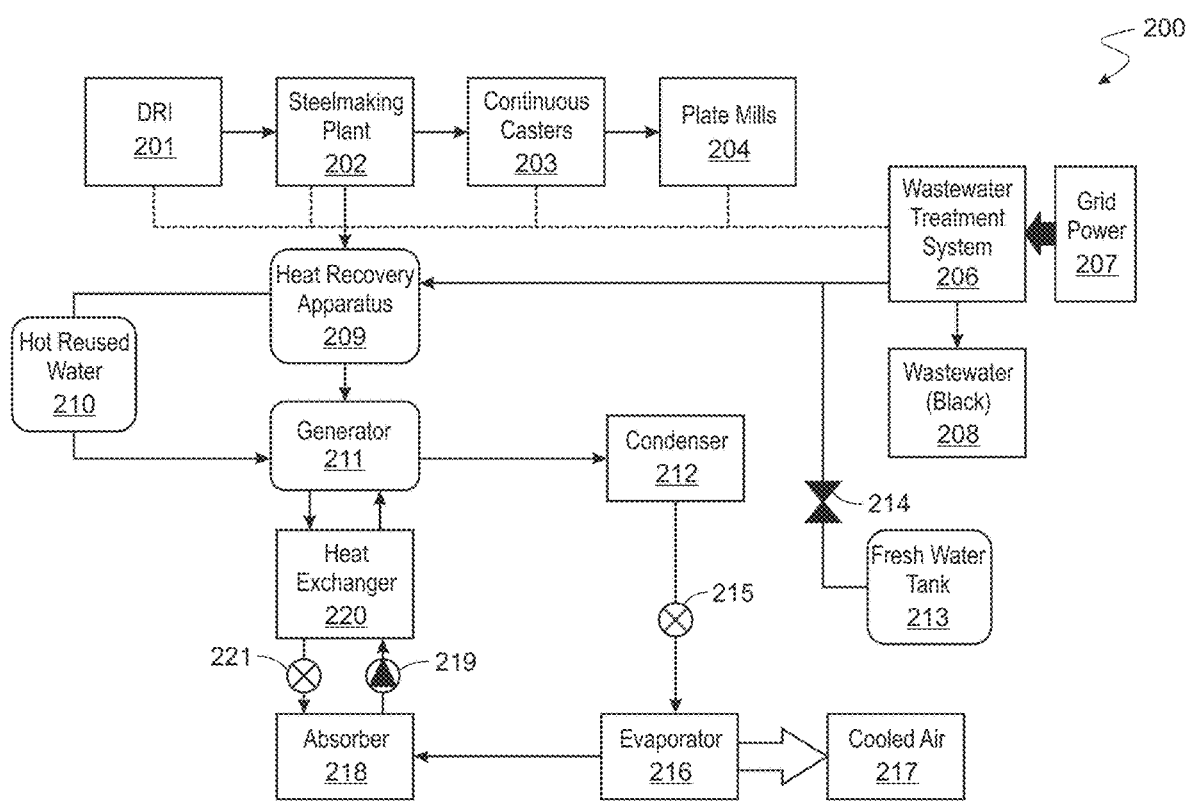
FIG. 2 is a diagram illustrates an example of an integrated system of energy optimization, wastewater treatment, and air-cooling in some implementations of the present disclosure.

Referring to FIG. 2, diagram 200 illustrates an example of an integrated system according to some implementations of the present disclosure. Steelmaking plant 202 is supplied with direct reduced iron (DRI 201) to generate continuous casters 203, which leads to plate mill 204. The steelmaking plant 202 has a liquid steel production capacity of between 0.4 and 0.6 million ton/year (e.g., 0.5 million ton/year). For example, direct reduced iron (DRI) production can include a shaft reduction furnace to produce DRI with large metal iron content by directly reducing iron ore (or iron ore pellets) with reducing gases. While the produced DRI is mainly used as the raw material of electric steelmaking, the produced DRI may also be used as blast furnace feed for energy saving (reduction in coke consumption) and increased production of molten iron at integrated blast furnace steelworks. The use of DRI as blast furnace feed can allow reduction in coal consumption in blast furnaces. In one example, when 100 kg of DRI is used for the production of 1 ton of molten iron, the consumption of coal in blast furnaces can be reduced by 50-60 kg. The reduction in the consumption of coal by charging DRI to blast furnaces can also allow reduction in $CO_2$ emission from steelworks. For example, when 100 kg of DRI is used for the production of 1 ton of molten iron, $CO_2$ emission (including that from the DRI production plant) can be reduced by 50-100 kg. When charging DRI with large metallic iron content to a blast furnace, the productivity of a blast furnace can also improve. For example, when 100 kg of DRI is used for the production of 1 ton of molten iron, the production of molten iron increases by 10-15%. In various implementations, steelmaking plant 202 may incorporate one or more electric arc furnaces (EAFs).

The manufacturing process (201, 202, 203, and 204) generates wastewater (illustrated as dashed lines in FIG. 2) Implementations of the present disclosure include a wastewater treatment system 206 that is powered by grid power 207 to process wastewater 208 and generate reused wastewater (208) for heat recovery apparatus 209. Wastewater treatment system 206 can apply a physical separation, or a chemical separation method, to wastewater from the furnaces at the steelmaking plant 202. The wastewater treatment system may process more than 200,000 $m^3$/year (e.g., 300,000 $m^3$/year) of wastewater. Heat recovery apparatus 209 can include a heat exchanger that transfers heat from process output (e.g., 201, 202, 203, and 204) at high temperature to generator 211 for increased efficiency Heat recovery apparatus 209 can also generate hot reused wastewater 210. Here, waste heat may be extracted from sources such as hot flue gases from the furnace of the steelmaking plant, steam from cooling towers, or from cooling processes such as in steel cooling.

Methods for treating industrial wastewater containing heavy metals such as steel industry may involve technologies for reduction of toxicity in order to meet technology-based treatment standards, thereby leading to chemical treatment often required. Physico-chemical removal processes such as, for example, adsorption on new adsorbents, ion exchange, membrane filtration, electrodialysis, reverse osmosis, ultrafiltration and photo catalysis may be applied. In the processes of biological treatment, microorganisms play a role of settling solids in the solution. Activated sludge, trickling filters, stabilization ponds may be widely used for treating industrial wastewater. Bioabsorption can be a nascent biological method and various low cost bioabsorbents (agricultural waste, forest waste, industrial waste, algae etc.) may be used for maximum removal of heavy metals from wastewater. Bioabsorption techniques can be eco-friendly best solutions for removing heavy metals from wastewater rather than physic-chemical methods. But chemical methods may remain most suitable treatments for toxic inorganic compounds produced from various industries which cannot removed from any biological and physical techniques. Biological treatments may also be eco-friendly, best removal and low cost methods. For example, various bio adsorbents can be found in nature. Physical and other most common chemical methods, on the other hand, can produce toxic sludge unable to settle within industries. Despite relative high cost, chemical treatment remains one of the most suitable treatments for toxic inorganic compounds produced from various industries which cannot removed using biological and physical techniques.

Generator 211, while receiving waste heat from heat recovery apparatus 209, also receives hot reused wastewater 210. Generator 211 may drive a Libr-$H_2O$ absorption system to generate cooled air for buildings of steelmaking plant 202. For example, generator 211 may utilize the extracted waste heat to heat a mixture of lithium bromide (LiBr) and water (including heated waste water 210). The heating process may separate lithium bromide (directed to absorber 218 via heat exchanger 220 and expansion valve 221) and water vapor (directed to condenser 212). Condenser 212 is cooled from an external source liquid water is provided via expansion valve 215 to evaporator 216. As used in the process, expansion value 215 operates on high-pressure liquid water to generate low-pressure, low-temperature liquid that feeds into evaporator 216 so that cooled air 217 is provided to the building complexes of steelmaking plant 202. An absorption cycle can be viewed as a mechanical vapor-compression cycle, with the compressor replaced by a generator, absorber and liquid pump. The absorption cycle may use only a fraction of the electrical input, and may use natural substances. As steel industry is a high temperature based industry, using a natural system cansave a substantial amount of energy.

While a LiBr and water mixture is an example of a refrigerant, other examples can also allow for evaporation at a relatively low boiling temperature (e.g., under 100° C.) when large amounts of heat is absorbed, thereby providing cooling. Other examples include ammonia and water, and carbon dioxide and water.

Because air cooling provided is premised on large amounts of water used by the Libr-$H_2O$ absorption system, the reused wastewater from wastewater treatment system 206 may not sufficient. When the air cooling cycle is in need of water that exceeds the amount provided by wastewater treatment system 206, the integrated system can draw on a fresh water tank 213 so that additional water supply can be pulled from valve 214. In some examples, the estimated wastewater is 300,000 $m^3$ and the expected treated water based on the literature is usually 65%-75% of the this total mount. The estimates would thus result in amount 200,000 $m^3$ annually, which will be sufficient to run the cooling cycle and provide the required amount of cold air to the buildings or to the process itself.

Implementations may use a control system to operate heat recovery apparatus 209, generator 211, wastewater treatment system 206, and the absorption system (e.g., condenser 212, absorber 218, evaporator 216, absorber 218, expansion valve 221, and pump 219). The control system can include one or more processors and achieves automation. For example, the control system can receive sensor input from heat recovery apparatus 209, generator 211, wastewater treatment system 206, and the absorption system so that, for example, in response to receiving information that the reused wastewater does not reach the threshold amount, the control system can use the one or more processors to automatically control an emergency valve 214 such that additional water is provided from a fresh water tank to the generator. The control system may also be configured to operate the generator 211 in tandem with the wastewater treatment system 206 such that the steelmaking plant 202 is cooled exclusively by cooled air from the absorption system.

Figure 3:
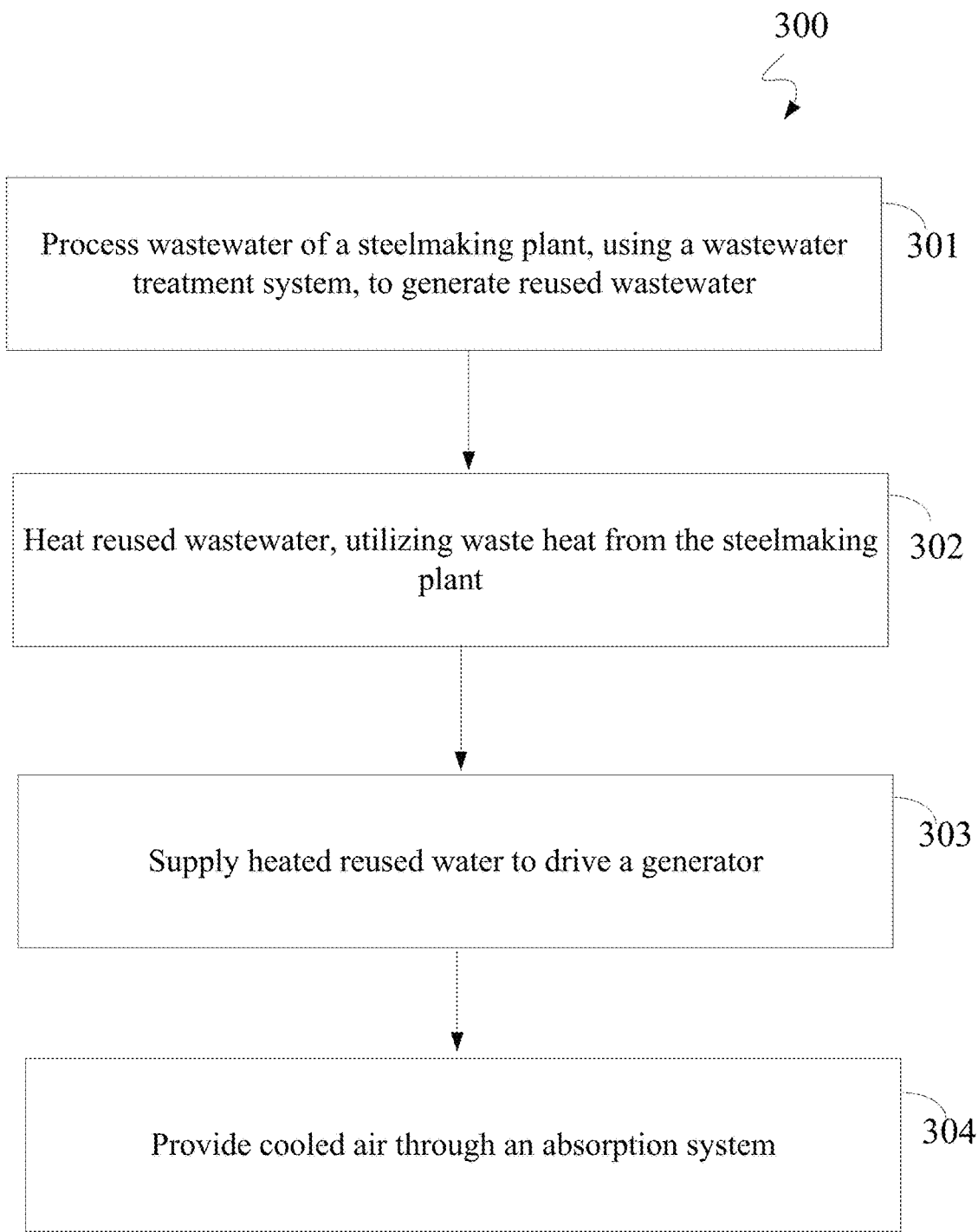
FIG. 3 is a flow chart illustrating an example according to some implementations of the present disclosure.

FIG. 3 is a flow chart 300 illustrating an example of a process according to some implementations of the present disclosure. The process may initially process wastewater of a steelmaking plant and generate reused wastewater (301). The process may then heat the reused water by utilizing waste heat (e.g., exhaust gas from the one or more furnaces at the steelmaking plant) so that the reused water exceeds a threshold temperature (302). The process may then supply the reused water heated above the threshold temperature to a generator (303). The reused water is supplied above a threshold amount such that the generator drives an absorption system arranged in circulation with the generator and configured to produce cooled air inside the steelmaking plant (304).

In some implementations, the process can be fully automated by a control system that includes one or more processors. The control system may receive sensor input from, for example, heat recovery apparatus 209, generator 211, wastewater treatment system 206, and the absorption system (e.g., condenser 212, absorber 218, evaporator 216, absorber 218, expansion valve 221, and pump 219). For example, when the reused water does not reach the threshold amount, the one or more processors can cause an emergency valve (e.g., valve 214) to open such that additional water is provided from a fresh water tank to drive generator 211. The control system can assert control over heat recovery apparatus 209, generator 211, wastewater treatment system 206, and the absorption system (e.g., condenser 212, absorber 218, evaporator 216, absorber 218, expansion valve 221, and pump 219).

Figure 4:
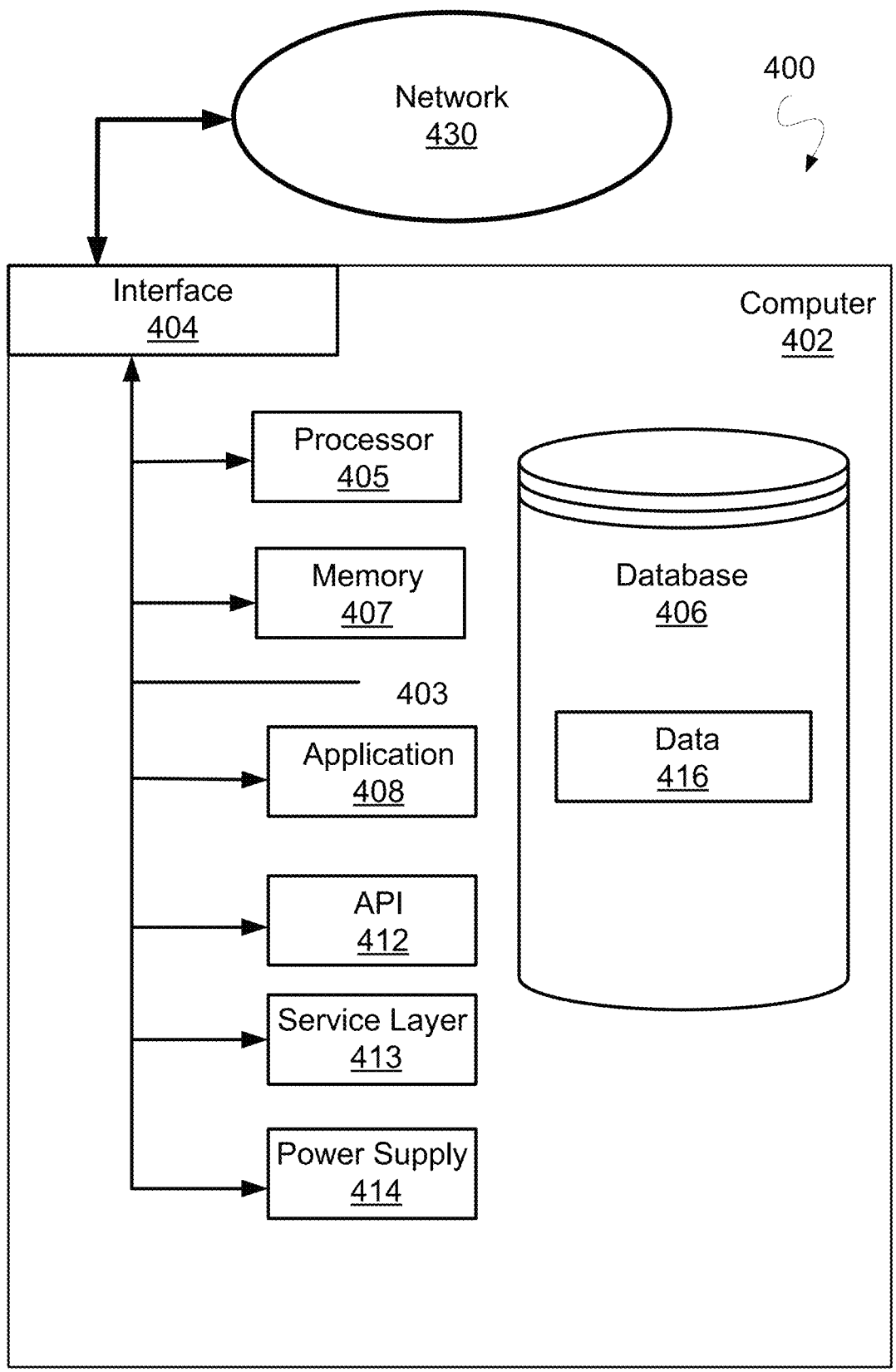
FIG. 4 is a block diagram illustrating an example of a computer system used to provide computational functionalities associated with described algorithms, methods, functions, processes, flows, and procedures, according to an implementation of the present disclosure.

FIG. 4 is a block diagram 400 illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computer that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

The computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users, external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds data 416 including, for example, data from sensors installed at steelmaking plant 202, wastewater treatment system 206, generator 211, and a LiBr—H2O absorption system, as explained in more detail in association with FIGS. 1-3.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A system comprising:
   a wastewater treatment system configured to process wastewater released by one or more furnaces at a steelmaking plant, and generate reused wastewater;
   a heat recovery apparatus coupled to the wastewater treatment system and a freshwater tank through at least one valve to receive a mixture of reused wastewater and fresh water, wherein the heat recovery apparatus is configured to heat the mixture of reused wastewater and fresh water, using exhaust gas from the one or more furnaces at the steelmaking plant, above a threshold temperature; and
   a generator coupled to the heat recovery apparatus and configured to receive, through a water inlet of the generator, the mixture of reused wastewater and fresh water heated above the threshold temperature; and
   an absorption system in circulation with the generator, wherein the mixture of reused wastewater and fresh water is supplied above a threshold amount such that the generator drives the absorption system and produces cooled air inside the steelmaking plant.

2. The system of claim 1, further comprising:
   a control system comprising one or more computer processors and configured to assert control, using the one or more computer processors, over the wastewater treatment system, the heat recovery apparatus, the generator, and the absorption system, wherein the control system is arranged in communication with the wastewater treatment system, the heat recovery apparatus, the generator, and the absorption system.

3. The system of claim 2, wherein the control system is further configured to:
   in response to receiving information that the mixture of reused wastewater and fresh water does not reach the threshold amount, use the one or more computer processors to automatically control an emergency valve such that additional fresh water is provided from the freshwater tank to the generator.

4. The system of claim 2, wherein the absorption system comprises: a lithium bromide (LiBr) absorption system.

5. The system of claim 2, wherein the absorption system comprises:
   a condenser coupled to the generator;
   an evaporator coupled to the condenser through a first expansion valve; and
   an absorber coupled to the evaporator, wherein the absorber is further coupled to the generator through a pump and a second expansion valve.

6. The system of claim 2, wherein the control system is configured to operate the generator in tandem with the wastewater treatment system such that the steelmaking plant is cooled exclusively by cooled air from the absorption system.

7. The system of claim 1, wherein the one or more furnaces comprise at least one electric arc furnace (EAF).

8. The system of claim 1, wherein the wastewater treatment system operates on grid power.

9. The system of claim 1, wherein the wastewater treatment system is configured to apply a physical separation, or a chemical separation method, to wastewater from the furnaces at the steelmaking plant.

10. The system of claim 1, wherein the wastewater treatment system is configured to process more than 200,000 $m^3$/year of wastewater.

11. The system of claim 10, wherein the steelmaking plant has a liquid steel production capacity of between 0.4 and 0.6 million ton/year.

12. A computer-implemented method comprising:
    generating reused wastewater using a wastewater treatment system that processes wastewater released by one or more furnaces at a steelmaking plant;
    heating a mixture of the reused wastewater provided by the wastewater treatment system and fresh water provided by a freshwater tank, wherein said heating utilizes exhaust gas from the one or more furnaces at the steelmaking plant, and wherein said heating causes the mixture of reused wastewater and fresh water to be exceed a threshold temperature; and
    supplying, using a water inlet, the mixture of reused wastewater and fresh water heated above the threshold temperature to a generator, wherein the mixture of reused wastewater and fresh water is supplied above a threshold amount such that the generator drives an absorption system arranged in circulation with the generator and configured to produce cooled air inside the steelmaking plant.

13. The computer-implemented method of claim 12, further comprising:
    asserting control over said generating, said heating and said supplying, using a control system that comprises at least one computer processor.

14. The computer-implemented method of claim 13, wherein, when the mixture of reused wastewater and fresh water does not reach the threshold amount, opening an emergency valve such that additional fresh water is provided from the freshwater tank.

15. The computer-implemented method of claim 13, further comprising:
   asserting control over the absorption system that comprises a lithium bromide (LiBr) absorption system.

16. The computer-implemented method of claim 15, wherein asserting control comprises asserting control over a condenser coupled to the generator, an evaporator coupled to the condenser through a first expansion valve, and an absorber coupled to the evaporator, wherein the absorber is further coupled to the generator through a pump and a second expansion valve.

17. The computer-implemented method of claim 12, wherein the one or more furnaces comprise at least one electric arc furnace (EAF).

18. The computer-implemented method of claim 12, further comprising:
   operating the wastewater treatment system using grid power.

19. The computer-implemented method of claim 12, wherein operating the wastewater treatment system comprises: applying at least one of: a physical separation, or a chemical separation method, to wastewater from the furnaces at the steelmaking plant.

20. The computer-implemented method of claim 12, further comprising:
   operating the generator in tandem with the wastewater treatment system such that the steelmaking plant is cooled exclusively by cooled air from the absorption system.

* * * * *